United States Patent
Dal Pont

(10) Patent No.: US 12,353,063 B2
(45) Date of Patent: Jul. 8, 2025

(54) HINGE OF THE FLEX TYPE FOR EYEGLASSES

(71) Applicant: LUXOTTICA S.R.L., Agordo (IT)

(72) Inventor: Moreno Dal Pont, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 468 days.

(21) Appl. No.: 17/788,371

(22) PCT Filed: Dec. 22, 2020

(86) PCT No.: PCT/IB2020/062322
§ 371 (c)(1),
(2) Date: Jun. 23, 2022

(87) PCT Pub. No.: WO2021/130666
PCT Pub. Date: Jul. 1, 2021

(65) Prior Publication Data
US 2023/0033269 A1    Feb. 2, 2023

(30) Foreign Application Priority Data

Dec. 23, 2019  (IT) .................. 102019000025189
Dec. 23, 2019  (IT) .................. 102019000025192

(51) Int. Cl.
*G02C 5/22* (2006.01)
*G02C 11/00* (2006.01)

(52) U.S. Cl.
CPC ............ *G02C 5/2236* (2013.01); *G02C 11/10* (2013.01)

(58) Field of Classification Search
CPC .................................. G02C 11/10; G02C 5/22
See application file for complete search history.

(56) References Cited

U.S. PATENT DOCUMENTS

| 10,353,221 | B1 | 7/2019 | Graff et al. |
| 2015/0131048 | A1 | 5/2015 | Jurilli |
| 2016/0124244 | A1 | 5/2016 | Marcoiu |

(Continued)

FOREIGN PATENT DOCUMENTS

| CN | 202018541 U | 10/2011 |
| CN | 214225603 U | 9/2021 |

(Continued)

OTHER PUBLICATIONS

International Search Report issued Apr. 15, 2021 re: Application No. PCT/IB2020/062322, pp. 1-4, citing: US 2018/252940 A1, U.S. Pat. No. 10,353,221 B1, US 2019/235274 A1, US 2019/196226 A1, US 2015/131048 A1, US 2019/1131048 A1, US 2019/113769 A1, EP 3 483 647 A1.

(Continued)

*Primary Examiner* — Christopher Stanford
(74) *Attorney, Agent, or Firm* — CANTOR COLBURN LLP

(57) ABSTRACT

A hinge of the flex type for eyeglasses, the hinge having an internally hollow central hinge body, adapted to be coupled to a second body, which is also internally hollow and is adapted to be coupled to an eyeglasses temple, and to a third body adapted to be coupled to the front of the eyeglasses. It is possible to assemble the central body and the second and third body in a pack, in order to define internally the passage of a data/power cable, the central body allowing an accumulation of the data/power cable and ensuring the passage of the cable between the temple and the front without stretching and/or torsion.

15 Claims, 10 Drawing Sheets

(56) References Cited

U.S. PATENT DOCUMENTS

| | | |
|---|---|---|
| 2018/0252940 A1 | 9/2018 | Rabut |
| 2019/0113769 A1 | 4/2019 | Jouard et al. |
| 2019/0196226 A1 | 6/2019 | Moore et al. |
| 2019/0235274 A1 | 8/2019 | Jouard et al. |
| 2019/0265510 A1 | 8/2019 | Eriksson et al. |
| 2021/0255482 A1 | 8/2021 | Ryner et al. |

FOREIGN PATENT DOCUMENTS

| | | |
|---|---|---|
| DE | 19540779 C1 | 1/1997 |
| EP | 3483647 A1 | 5/2019 |
| FR | 2161470 A5 | 7/1973 |
| FR | 2481471 A1 | 10/1981 |
| FR | 2485212 A3 | 12/1981 |
| FR | 2665268 A1 | 1/1992 |
| FR | 2838530 A1 | 10/2003 |
| GB | 2087094 A | 5/1982 |
| JP | 06048215 Y | 12/1994 |
| JP | 2018189779 A | 11/2018 |
| KR | 20120049557 A | 5/2012 |
| WO | 2010084772 A1 | 7/2010 |
| WO | 2018084772 A1 | 5/2018 |

OTHER PUBLICATIONS

IT Search Report issued Aug. 26, 2020 re: Application No. 201900025189, pp. 1-8, citing: US 2018/252940 A1, U.S. Pat. No. 10,353,221 B1, US 2019/235274 A1, US 2019/196226 A1, US 2015/131048 A1, US 2019/113769 A1, EP 3 483 647 A1.

IT Search Report issued Aug. 5, 2020 re: Application No. 201900025192, pp. 1-8, citing: FR 2 485 212 A3, GB 2 087 094 A, FR 2 665 268 A1, FR 2 161 470 A5, DE 195 40 779 C1, FR 2 838 530 A1 and FR 2 481 471 A1.

Written Opinion issued Apr. 15, 2021 re: Application No. PCT/IB2020/062322, pp. 1-5, citing: US 2018/252940 A1 and U.S. Pat. No. 10,353,221 B1.

Japanese Office Action for Application No. 2022-538797, dated May 15, 2024, 27 pages with translation.

Japanese Office Action for Application No. 2022-538797, dated Oct. 15, 2024, 4 pages with translation.

Israeli Office Action for Application No. 293870, dated Nov. 26, 2024, 5 pages with translation.

HINGE OF THE FLEX TYPE FOR EYEGLASSES

TECHNICAL FIELD

The present disclosure relates to a hinge of the flex type for eyeglasses. More specifically, the present disclosure relates to a hinge of the flex type that can be used together with a flexible PCB cable for the transmission of data and/or power between the temple of a pair of eyeglasses and the front of the same.

BACKGROUND

As is known, so-called "electronic" eyeglasses need to transfer data and/or power from the temple of the eyeglasses to the front of same by using a cable which is usually a flexible PCB cable, i.e. a ribbon-type cable.

The transmission of the data and/or power by way of the above mentioned cable must be done in a cable that undergoes the least possible deformations and which is not subjected to traction forces when the user folds the temples of the eyeglasses onto the front, in order to ensure correct transmission of the data and/or power.

Furthermore, the PCB cable obviously must not be visible from outside the temple of the eyeglasses, and it must allow the temple to be folded, therefore sliding inside the coupling between temple and front but without any sticking that could result in damage to the PCB cable itself, owing to chafing.

As is also known, a hinge of the flex type is a hinge that is used in eyeglasses in order to allow an over-rotation of the temple with respect to the front, so as to prevent damage of the hinge if the user should inadvertently splay the temple excessively with respect to the front.

In conventional flex hinges, generally the profile of the external contact edge between the temple and the front is usually parallel to the rotation axis of the hinge.

Hinges of the flex type also exist in which this does not happen. In such types of hinges, the profile of the external contact edge between the temple and the front is not parallel to the rotation axis of the hinge.

In this case, the rotation both to close and to over-open the temple with respect to the front causes sticking of the hinge component connected to the temple with respect to the hinge component connected to the front, and with respect to the front itself, which in the long term leads to the wearing-out of the parts that constitute the end of the front and of the temple, as well as of the hinge.

SUMMARY

The aim of the present disclosure is to provide a hinge of the flex type for eyeglasses that can be used in eyeglasses of the electronic type, in combination with a flexible PCB cable that ensures minimal stresses for the cable itself.

Within this aim, the present disclosure provides a hinge of the flex type for eyeglasses, wherein the particular shape structure of the hinge allows the flexible PCB cable to move and slide in the coupling between the temple and the front, without sticking, unwanted torsion, or tearing.

The present disclosure further provides a hinge of the flex type for eyeglasses that completely hides the passage of the PCB cable within it, without altering its functionality.

The present disclosure also provides a hinge of the flex type for eyeglasses that allows an improved rotation between the temple and the front in a situation where the external contact edge between the temple and the front is not parallel to the rotation axis of the hinge.

The present disclosure further provides a hinge of the flex type for eyeglasses, wherein the simplified rotation takes place both when closing the temple onto the front and when there is over-rotation of the temple with respect to the front.

The present disclosure provides a hinge of the flex type for eyeglasses wherein externally, the hinge looks like a hinge with the profile of the external contact edge between the temple and the front not parallel to the rotation axis of the hinge.

The present disclosure also provides a hinge of the flex type that is highly reliable, easily and practically implemented and of low cost.

This aim and these and other advantages which will become better apparent hereinafter are achieved by providing a hinge of the flex type for eyeglasses, characterized in that it comprises an internally hollow central hinge body, adapted to be coupled to a second body, which is also internally hollow and is adapted to be coupled to an eyeglasses temple, and to a third body adapted to be coupled to the front of the eyeglasses, said central body and said second and third body being configured to be assembled in a pack, in order to define internally the passage of a data/power cable, said central body allowing an accumulation of the data/power cable and ensuring the passage of the cable between the temple and the front of the eyeglasses without stretching and/or torsion.

BRIEF DESCRIPTION OF THE DRAWINGS

Further characteristics and advantages of the disclosure will become better apparent from the description of a preferred, but not exclusive, embodiment of the flexible hinge according to the disclosure, which is illustrated by way of non-limiting example in the accompanying drawings wherein.

DETAILED DESCRIPTION OF THE DRAWINGS

Figure 1:
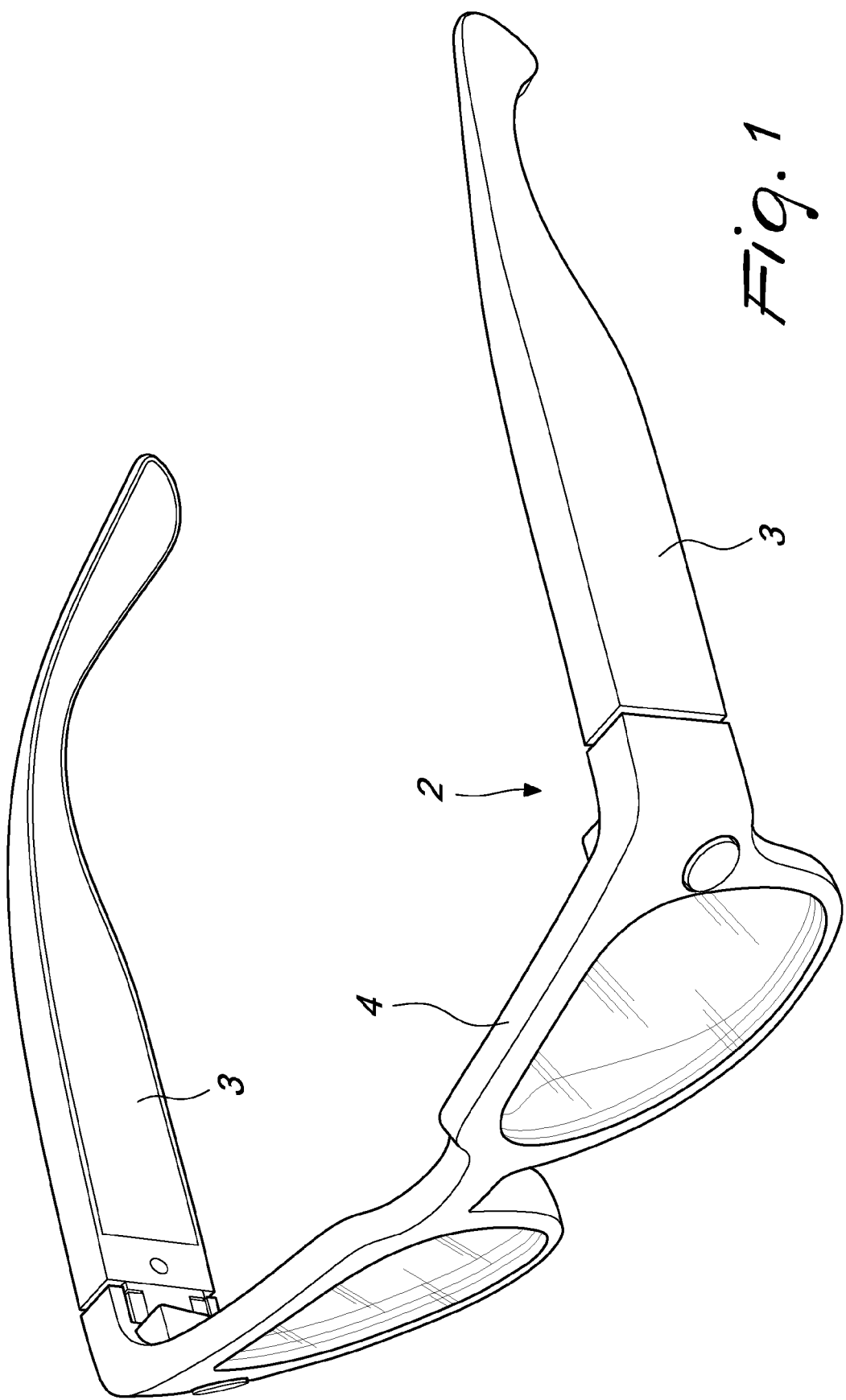
FIG. 1 is a perspective view of a pair of eyeglasses with a hinge according to the present disclosure.
Figure 2:
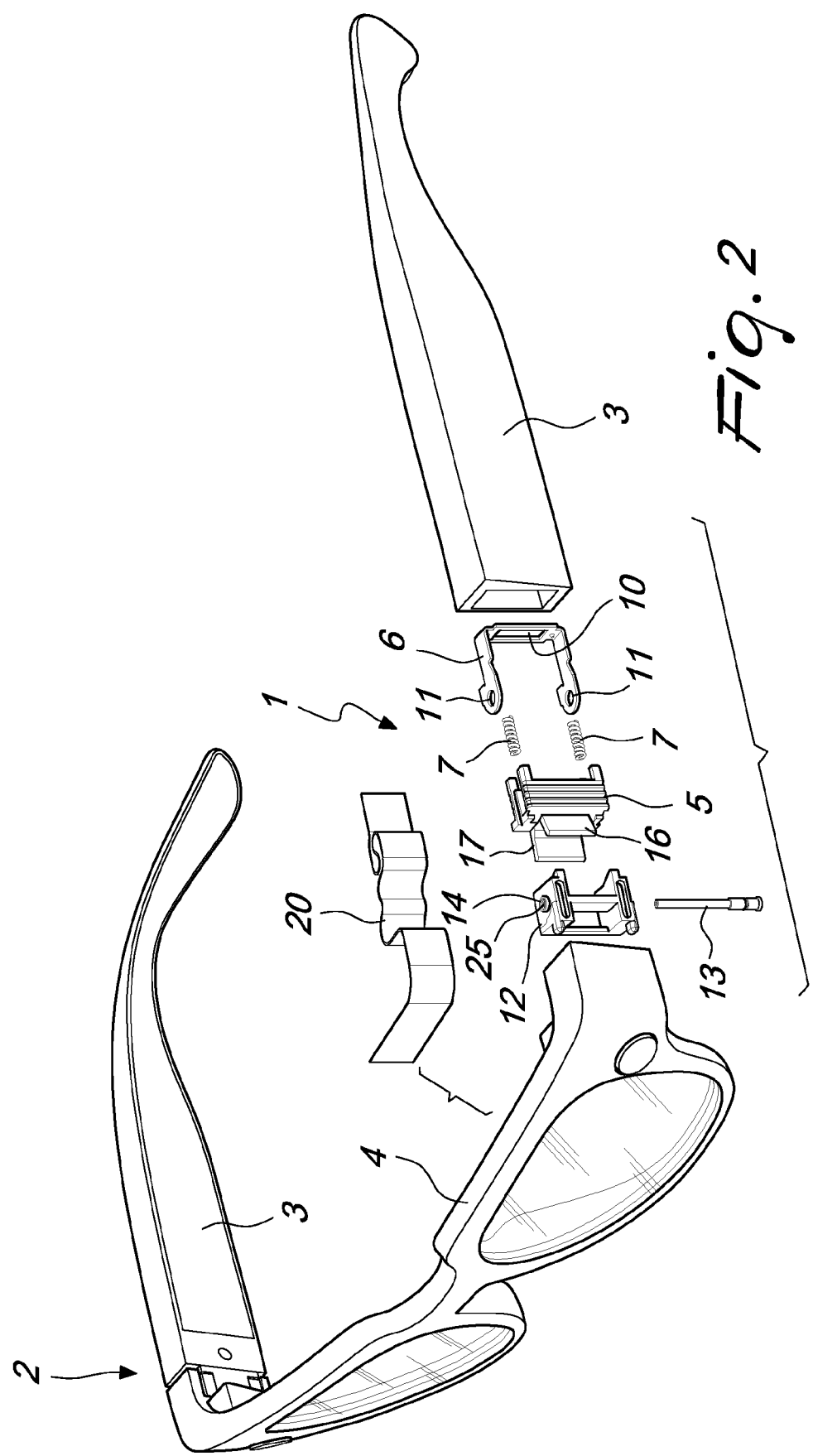
FIG. 2 is an exploded perspective view of the eyeglasses with the hinge according to the present disclosure.
Figure 3:
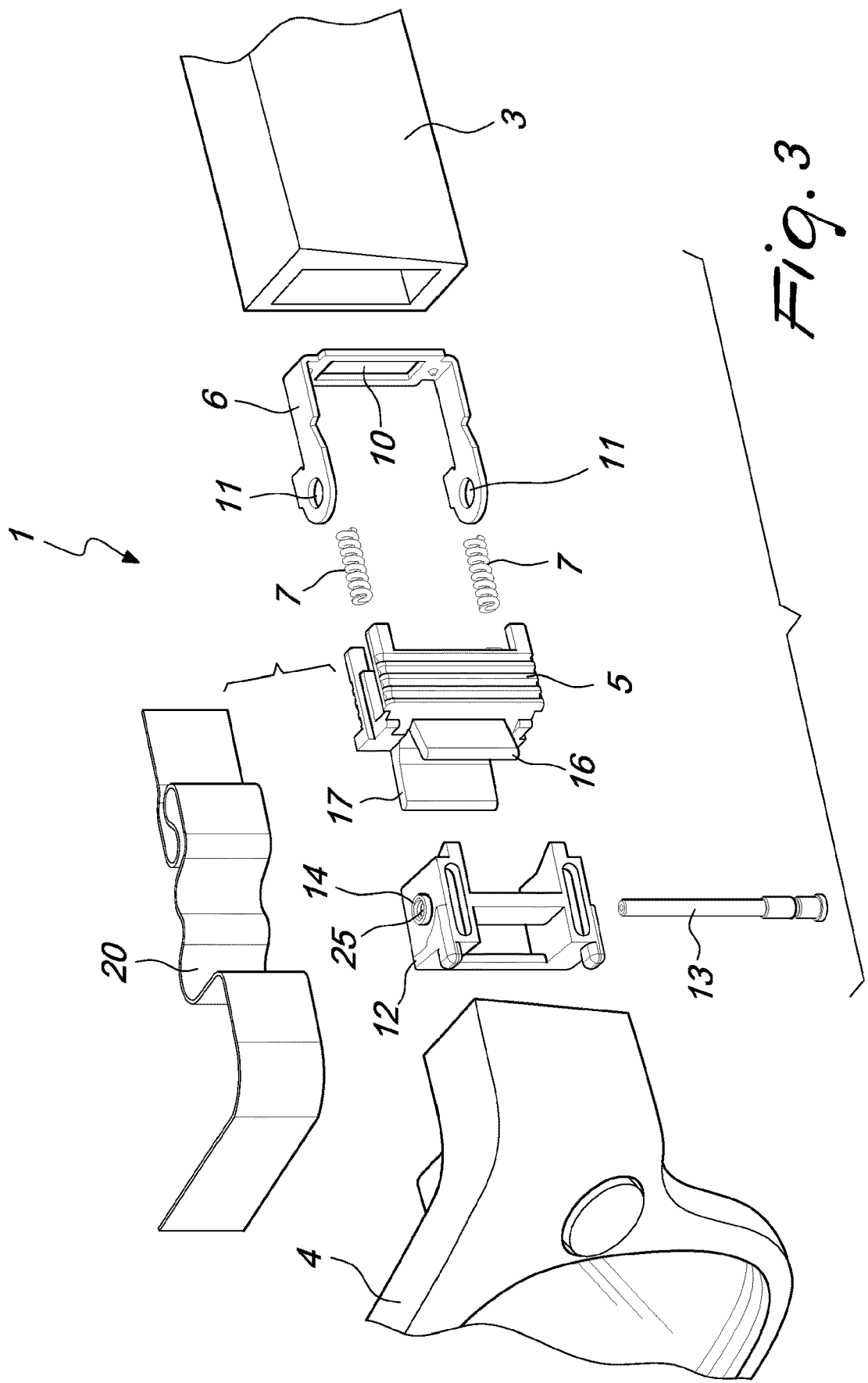
FIG. 3 is an enlarged, partially exploded perspective view of a detail of the hinge according to the disclosure.
Figure 4:
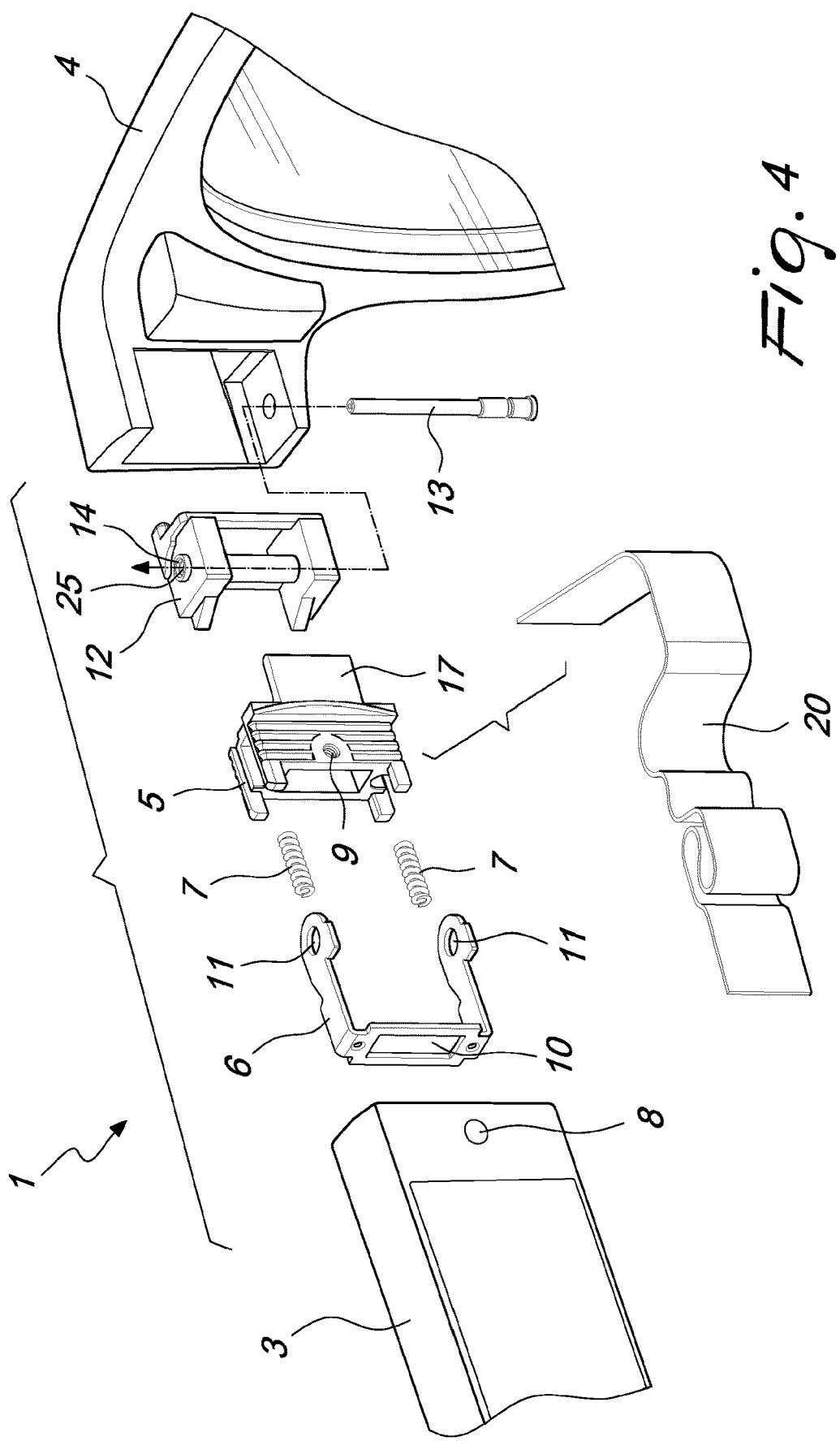
FIG. 4 is a partially exploded perspective view of the hinge according to the disclosure from a viewpoint opposite to that of FIG. 3.

With reference to the figures, the hinge of the flex type according to the disclosure, generally designated by the reference numeral 1, is adapted to be used in a pair of eyeglasses 2 that is provided with a pair of temples 3 that can be folded, using the hinge 1, onto a front 4 of the eyeglasses.

The hinge 1 comprises an internally hollow central body 5, in which a flexible PCB cable 20 is adapted to pass through and to be accommodated folded in loops within the central body 5 so as to have a form of buffer of cable 20 that makes it possible to fold the temple 3 onto the front 4 (or to perform an over-rotation when opening the temple with respect to the front) without the cable being subjected to unwanted sticking or traction forces.

The central body 5 is coupled to a second body 6 which is intended to be accommodated within the temple 3, when joined to the central body 5, with the interposition of elastic means 7, such as for example helical springs, which abut against and between the body 6 and the central body 5. The central body 5 is locked in place within the temple 3 for example using screw locking means which are inserted into a hole 8 in the temple 3 and into a corresponding threaded hole 9 in the central body 5.

The body 6 is also hollow so that the flexible PCB cable 20 can pass through an opening 10 in it. The body 6 is conveniently C-shaped and is provided with a pair of eyelets 11 which enable coupling with an additional body 12 (i.e., a third body constituting the hinge according to the disclosure), which is provided with mutually opposite protrusions 14 that allow coupling with the eyelets 11 of the second body 6 so as to define a pack-like body which is constituted by the coupling of the central body 5 within the second body 6 and with the third body 12. The pack-like body (central body 5, second body 6 and third body 12) is also held together by the walls of the pocket of the front 4 into which the pack-like body is inserted. Preferably a locking pin 13 is inserted into a through hole 25 defined at the mutually opposite protrusions 14 (which therefore constitute the raised edge of the through hole 25) in order to fix the third body 12 to the front.

The hinge thus provided is therefore constituted by a pack-like body which is constituted by the central body 5, by the body 6 and by the body 12, which are coupled to the front.

The body 12 is in turn adapted to be accommodated within the front 4 of the eyeglasses and coupled thereto using the pin 13.

The body 12 is also hollow so as to allow the passage of the flexible PCB cable 20 up to the front 4 of the eyeglasses.

The central body 5 is conveniently provided with a pair of wings 16 and 17 which are adapted to define a kind of fork, the function of which is to completely hide the central cable 20 from view, rendering the temple—whether open or closed—completely similar to a standard temple from an aesthetic point of view.

Figure 5:
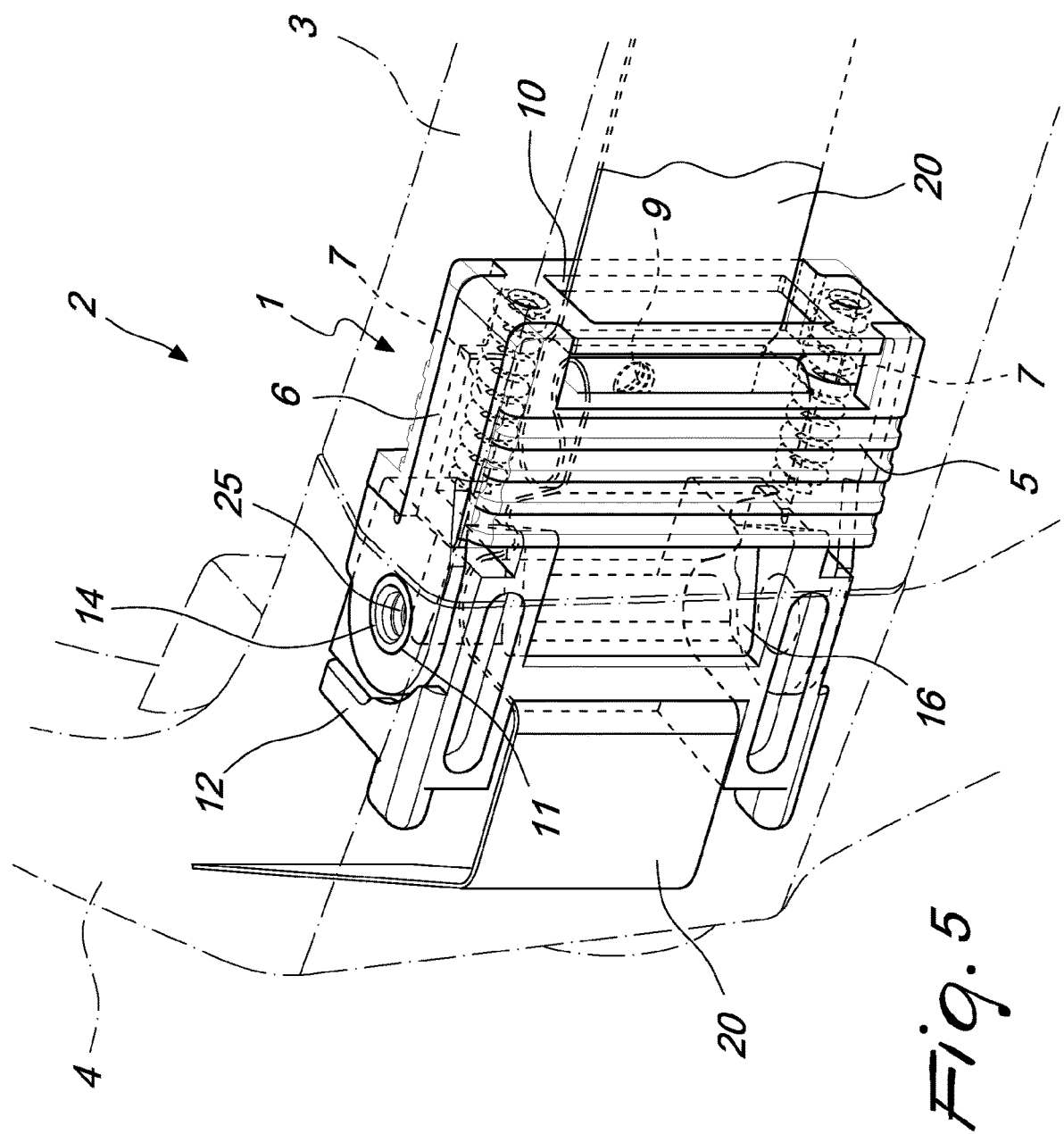
FIG. 5 is a partial perspective view of the coupling between the temple and the front with the hinge according to the disclosure, with the flexible PCB cable inserted.
Figure 6:
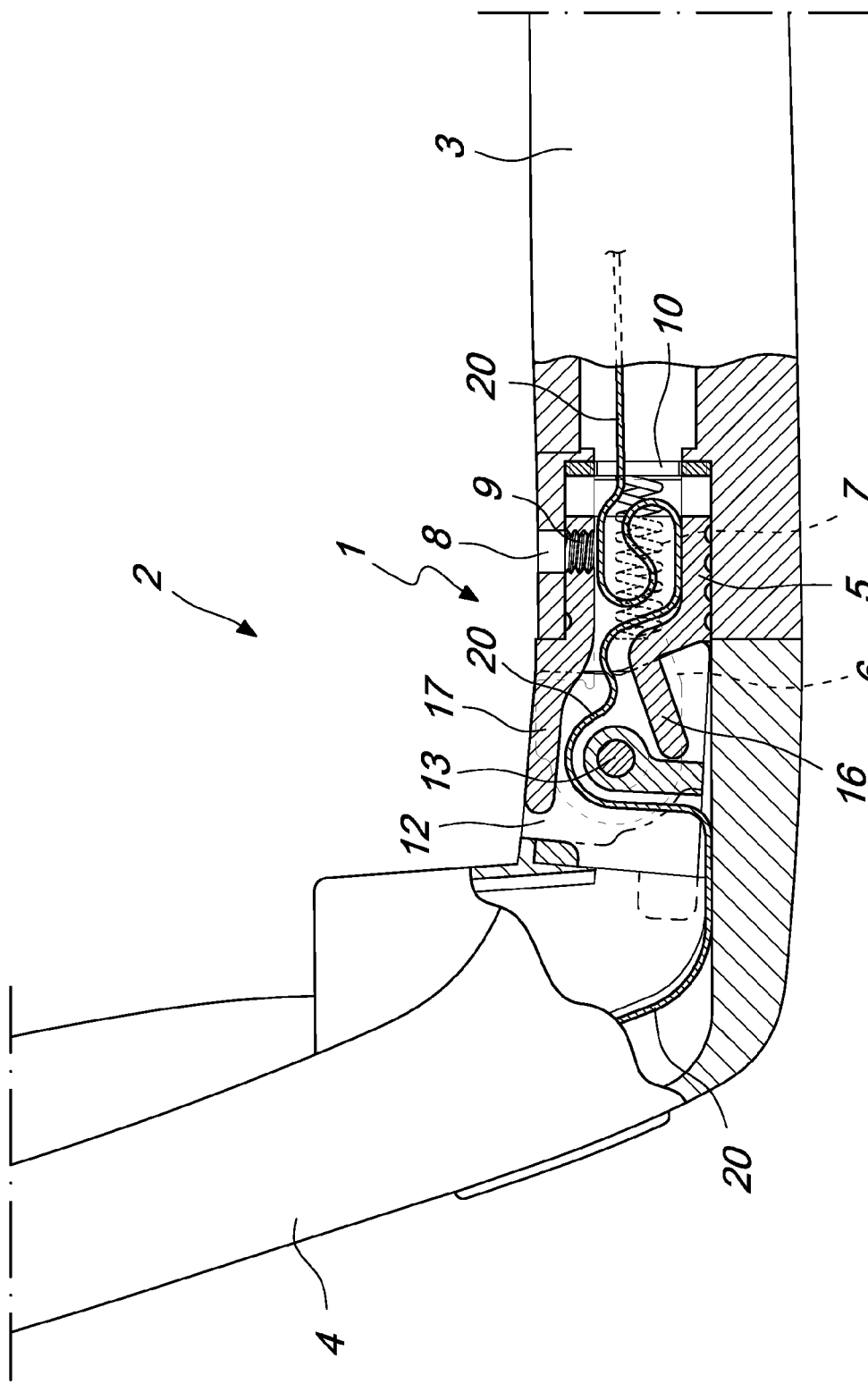
FIG. 6 is a longitudinal cross-sectional view of the hinge according to the disclosure applied to a pair of eyeglasses.
Figure 7:
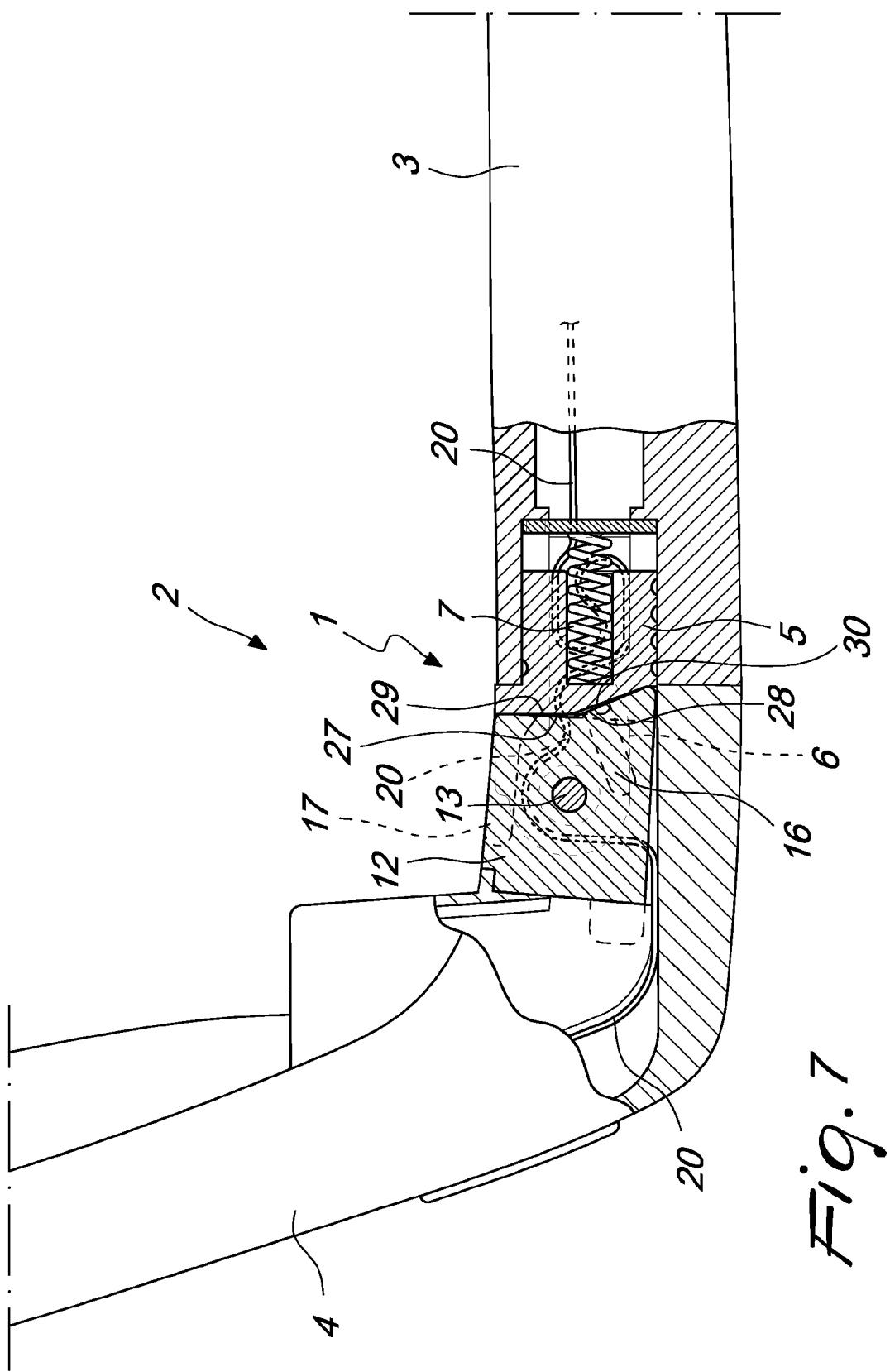
FIG. 7 is an additional longitudinal cross-sectional view of the hinge according to the disclosure.

As can be seen from FIG. 5, the flexible PCB cable 20 passes through the various component elements of the hinge 1, following a path that allows a buildup of flexible cable within the central body 5, in order to then pass around a cylindrical body, the seat of the pin 13 that ends with the mutually opposite protrusions 14, and then enter the front 4 of the eyeglasses.

The passage of the flexible PCB cable 20 in this manner makes it possible for the cable not to be subjected to traction forces and sticking against pointed portions of the hinge, and instead it is simply guided inside the cavity of the hinge passing around the cylindrical body, which is the seat of the pin 13 and which has a rounded portion and which therefore allows a rotation of the temple 3 with respect to the front 4 without the cable being subjected to tearing or other damage.

Figure 8:
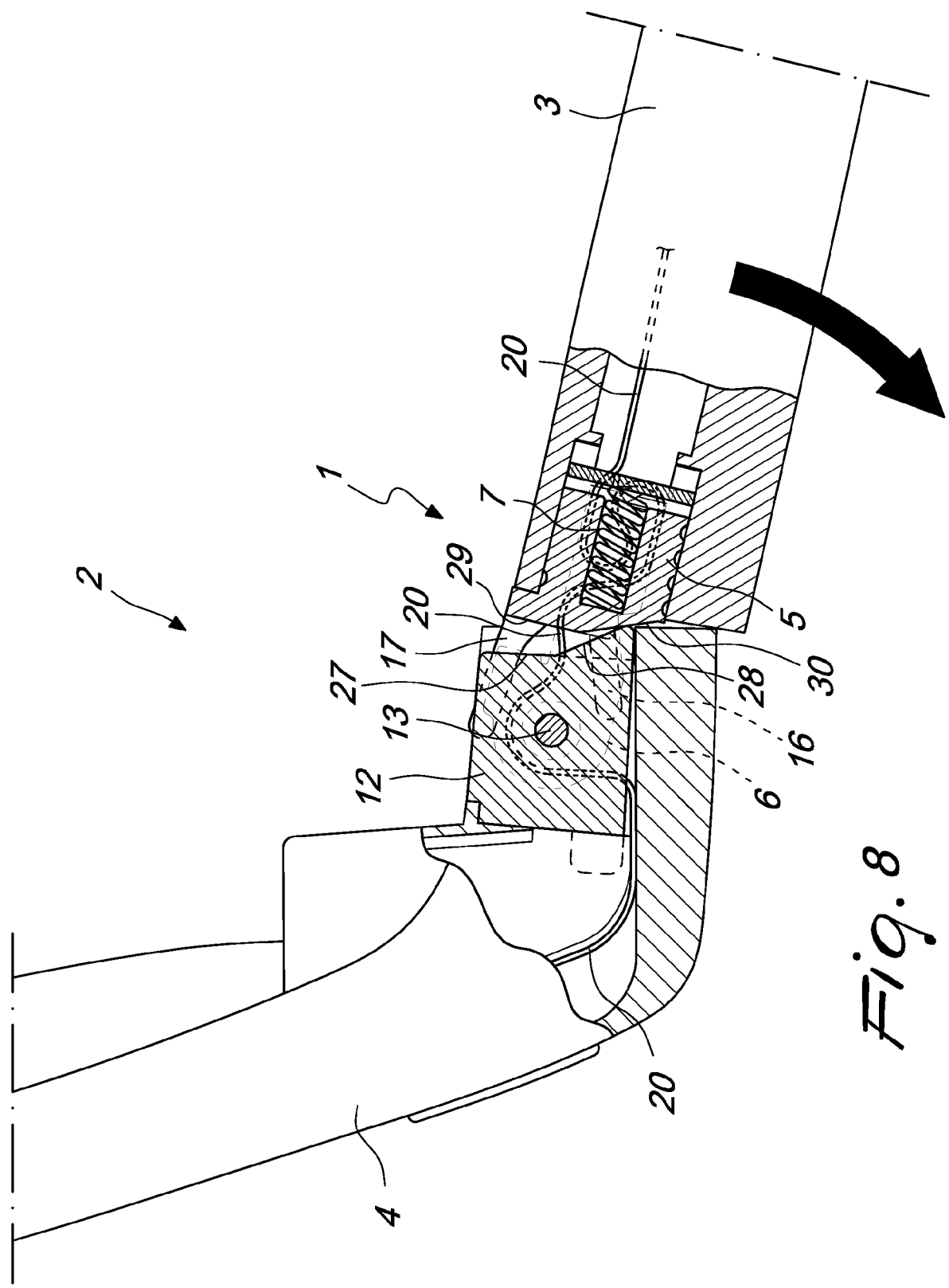
FIG. 8 is a longitudinal cross-sectional view of the hinge according to the disclosure in the condition of over-opening the temple.
Figure 9:
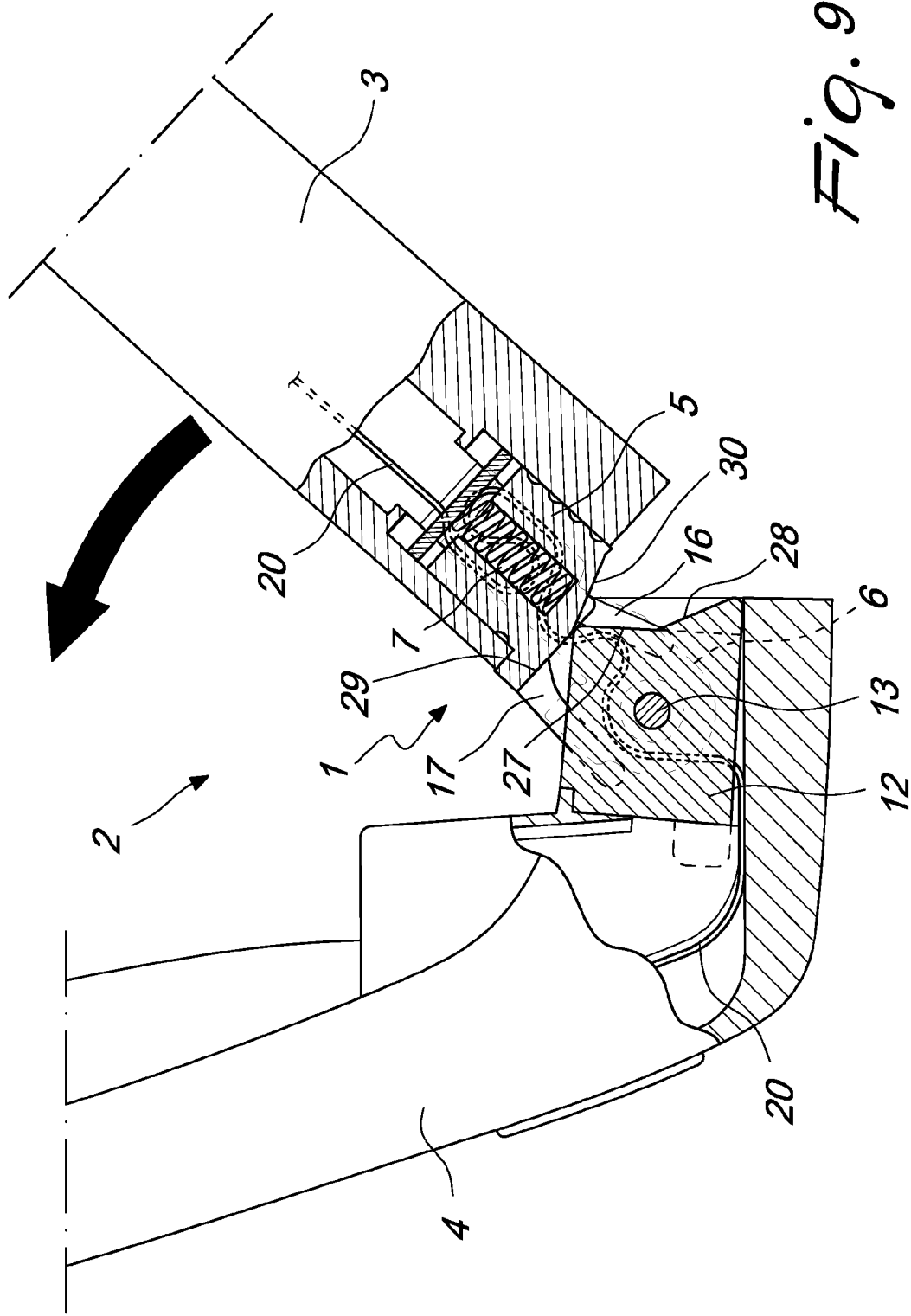
FIG. 9 is a longitudinal cross-sectional view of the hinge according to the disclosure in the condition of folding the temple onto the front.
Figure 10:
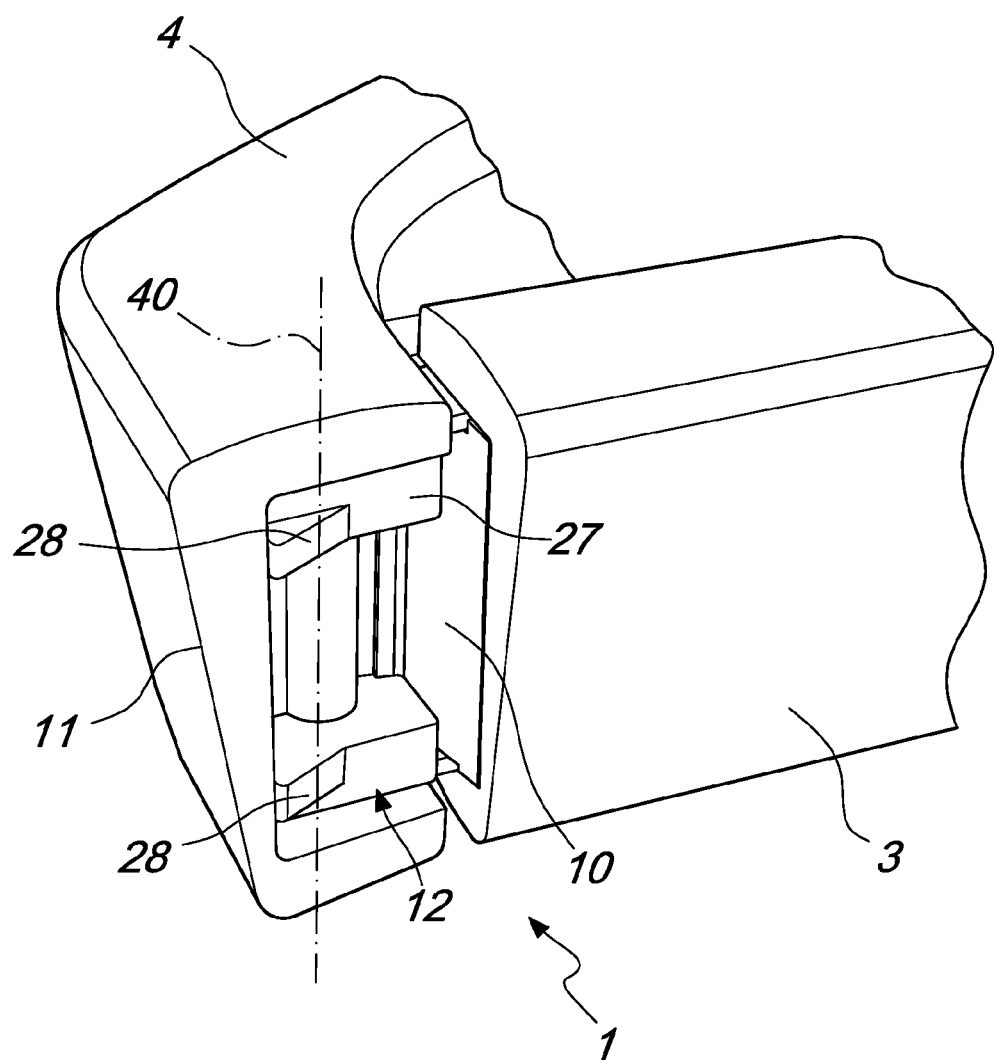
FIG. 10 is an additional partial perspective view of the hinge according to the disclosure.

The hinge of the flex type has elastic means 7 which make it possible for the hinge to allow an over-rotation of the temple with respect to the front, such as for example illustrated in FIG. 8.

Conveniently, the hinge body 12 connected to the front 4 has a first portion 27, preferably perpendicular to the longitudinal axis of the temple 3, which is blended with a second portion 28 which is arranged along an inclined plane.

Preferably, the axis of arrangement of the inclined plane 28 must be parallel to the rotation axis of the hinge.

Similarly, the body 5 of the hinge has a first portion 29 which is preferably perpendicular to the longitudinal axis of the hinge, and a second portion 30 which is angled so as to be complementary to the second portion 28 of the body 12 of the hinge.

The inclined planes 28 and 30 respectively of the hinge body 12 and of the hinge body 5 are arranged so as to be hidden from view when the hinge is mounted on the eyeglasses, so that externally the coupling between the temple and the front occurs along a profile 11 that is not parallel to the rotation axis 40 of the hinge.

In this manner, the hinge body 5 during over-rotation lies with its portion 30, which is preferably perpendicular to the longitudinal axis of the temple 3, on the inclined plane 28, thus reducing the wear of the component parts of the hinge and of the end of the front to which the temple is coupled.

In practice it has been found that the hinge according to the disclosure fully achieves the set aim and objects, in that it makes it possible to achieve, in a hinge of the flex type, i.e. that allows an extra rotation of the temple with respect to the front of the eyeglasses and a typically bistable behavior during opening and closing of the temple, the passage of a flexible PCB cable, thus ensuring its full functionality over time by virtue of the absence of potential damage deriving from the passage of the cable in contact with pointed portions of the hinge itself, or in any case preventing the cable from being subjected to unwanted torsion and stretching.

Furthermore, the hinge according to the disclosure makes it possible to perform a closing rotation and an over-rotation of the temple with respect to the front without the component parts becoming jammed against each other and so wearing out the hinge itself. The presence of an inclined plane in a position hidden from view when the hinge is mounted on the eyeglasses and the temple is in the operative position makes it possible to perform a gentler sliding of one hinge component with respect to the other, by virtue of the fact that there is a sliding of the second hinge body with respect to the first body, in which the second body moves along the inclined plane of the first body.

The hinge, thus conceived, is susceptible of numerous modifications and variations, all of which are within the scope of the appended claims.

Moreover, all the details may be substituted by other, technically equivalent elements.

In practice, the materials used, as well as the contingent shapes and dimensions, may be any according to the requirements and to the state of the art.

The disclosures in Italian patent applications no. 102019000025189 and no. 102019000025192 from which this application claims priority are incorporated herein by reference.

The invention claimed is:

1. A hinge for eyeglasses comprising: an internally hollow central hinge body, adapted to be coupled to a second body, which is also internally hollow and is configured to be coupled to an eyeglasses temple, and to a third body configured to be coupled to a front of the eyeglasses, said central body and said second and third body being configured to be assembled in a pack, in order to define internally a passage of a data/power transmission cable, said central hinge body allowing an accumulation of the data/power cable and ensuring the passage of the data/power cable between the eyeglasses temple and the front of the eyeglasses, wherein said second body is C-shaped and configured to be coupled to said third body, with interposition of said central hinge body and elastic means, said second body being provided with a pair of eyelets adapted to be inserted into mutually opposite protrusions which are defined at said third body.

2. The hinge according to claim 1, wherein said central hinge body and said second body are adapted to be accommodated within said eyeglasses temple.

3. The hinge according to claim 1, wherein said third body is adapted to be accommodated within said front.

4. The hinge according to claim 1, wherein said central hinge body has a pair of wings arranged like a fork and adapted to conceal completely from view said data/power cable.

5. The hinge according to claim 1, wherein said data/power cable is a flexible PCB cable.

6. The hinge according to claim 1, wherein said data/power cable passes around a cylindrical body of said third body that defines said protrusions, in order to be inserted into said front.

7. The hinge according to claim 1, wherein said elastic means are interposed between said central hinge body and said second body.

8. The hinge according to claim 1, wherein said central hinge body allows an undulated accumulation of said data/power cable, in order to define a cable stock in order to allow a folding of said eyeglasses temple with respect to said front and an extra rotation of said eyeglasses temple, without stretching and/or tearing of said data/power cable.

9. The hinge according to claim 1, wherein said elastic means are configured to allow an over-rotation of the eyeglasses temple with respect to the front.

10. The hinge according to claim 1, wherein said third hinge body has an inclined plane which is adapted to allow a sliding thereupon of said central hinge body when an over-rotation is performed of said eyeglasses temple with respect to said front.

11. The hinge according to claim 10, wherein said inclined plane of said third body is hidden from view when said eyeglasses temple is in the position of normal opening with respect to said front.

12. The engine according to claim 10, wherein said third body comprises, at an interface with said central hinge body, a portion that is perpendicular to a longitudinal axis of said eyeglasses temple, in the position of normal opening of the eyeglasses temple, which is connected with said inclined plane of said third body.

13. The hinge according to claim 10, wherein said central hinge body comprises, at an interface with said third body, a portion that is perpendicular to a longitudinal axis of said temple, in the position of normal opening of the eyeglasses temple, which blends with an inclined plane that is complementary to the inclined plane of said third hinge body.

14. The hinge according to claim 1, wherein said third body and said central hinge body, when said eyeglasses temple is in the normal open position with respect to said front, are coupled according to a profile of an external contact edge between the eyeglasses temple and the front that is not parallel to a rotation axis of the hinge.

15. Eyeglasses comprising at least one hinge according to claim 1.

* * * * *